Figure 1:
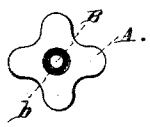

(No Model.)

P. HATHAWAY.
GALVANIC BATTERY.

No. 454,598. Patented June 23, 1891.

Witnesses:

Inventor:
Philip Hathaway.

UNITED STATES PATENT OFFICE.

PHILIP HATHAWAY, OF NEW YORK, N. Y.

GALVANIC BATTERY.

SPECIFICATION forming part of Letters Patent No. 454,598, dated June 23, 1891.

Application filed September 18, 1890. Serial No. 365,445. (No model.)

*To all whom it may concern:*

Be it known that I, PHILIP HATHAWAY, a citizen of the United States, and a resident of the city, county, and State of New York, have invented certain new and useful Improvements in Galvanic Batteries, of which the following is a specification.

In constructing my improved battery I use zinc for the positive element and chloride of silver for the negative element. I construct the zinc element in the form of a tube closed at one end and open at the other. This tube may be of any required size, but preferentially and for ordinary purposes—such as for use with an electric bell—I make it about two and one-half inches long and about five-eighths of an inch inside diameter. In the upper or open end of the inside of such tube I form circumferential grooves for the purposes of engaging with the cement which forms the seal of the battery, and so rendering such seal more secure. The negative element of the battery is composed of chloride of silver cast in the form of a rod having a deeply indented or corrugated surface for the purpose of exposing the largest possible surface of chloride of silver to the action of the excitant, and also for the purpose of bringing the projecting parts of the surface of such rod as near as possible to the internal surface of the zinc tube, by which means I very largely diminish the internal resistance of the battery, while at the same time, in consequence of the deep recesses formed in the surface of the rod, ample space is obtained for a proper amount of excitant. I form this chloride-of-silver rod by casting the chloride of silver in a mold round a central axis of silver wire or copper wire electroplated with silver, which wire acts as the conductor or electrode of the negative element. This central wire or axis is made longer than the zinc tube, so that when placed therein the upper end of the wire projects and forms a suitable electrode for such negative element. In casting this rod I take especial care that this silver wire shall project from the lower end of the chloride of silver, so as to form a conducting-pole for the electrical current. Such projection should be at least one-eighth of an inch.

In constructing the battery I proceed as follows: I take the zinc tube and place at the bottom of it a washer of the same diameter as the inside of the tube made of hard rubber, glass, or other suitable insulating material, having first affixed to the upper surface of such washer a disk of silver foil of such a size as to extend to a distance of about one-sixteenth of an inch from the circumference of such washer. I then place in the tube any suitable fluid excitant thickened with any suitable thickening material, using, preferentially, an albuminous or gelatinous material for this purpose till such excitant is in a semi-fluid condition or about the consistency of thin jelly. The quantity of such excitant is regulated so as to reach exactly to the top of the chloride of silver when inserted therein. I then slip over the lower end of the chloride-of-silver rod a small rubber ring to prevent the possibility of contact between the rod of chloride of silver and the zinc, and to insure such rod remaining in the center of the zinc tube, the thickness of this rubber ring being such as to fit closely between the rod and the zinc tube, and I incase the upper projecting part of the central wire or axis of such rod with tight-fitting rubber tubing to within a short distance of its upper end. In some cases I place over such rubber tubing a second piece of rubber tubing of such size as to fit closely around the first rubber. I then plunge the chloride-of-silver rod into the zinc tube containing the excitant, so that the projecting lower pole of the central wire or axis of the rod shall rest on the center of the silver-foil disk affixed to the washer placed at the lower end of the tube, and make electrical contact with such disk. I then take another washer made of hard rubber or other suitable non-conducting material, of the exact internal diameter of the zinc tube and having affixed a silver-foil disk of similar size, as before, to the under side of such washer, I make a small hole in the center of such washer and slip it over the rubber-covered wire with the silver-foil disk downward, in such manner as that the silver-foil disk shall rest on the top of the chloride of silver and be in electrical contact therewith. This upper washer will then fit snugly against the inner circumference of the zinc tube, and the upper end of the central wire or axis will project through the center of such washer. I then drop a small quantity of melted paraffine on the washer, so as to form a film or thin layer over its upper surface for the purpose of preventing any contact between the excitant and the cement seal next described, and I finally fill the remainder of the zinc tube with Portland cement or with such other similar cement as when set hard will permit the hydrogen gas evolved in the working of the battery to pass through it, but will be completely impervious to the passage of liquids. When such cement is set or dried into a hard mass, the battery is complete. It will be found that a battery thus constructed will possess the least possible internal resistance, will be perfectly dry, and will not be liable to burst, as is very frequently the case with close-sealed chloride-of-silver batteries—as, for instance, in batteries when the seal is composed of plaster-of-paris or other substances practically impervious to hydrogen gas.

In my battery the hydrogen gas escapes freely, partly through the pores of the Portland cement and partly by compressing the rubber tubing placed round the upper part of the central wire, as such tube acts as an elastic vent for the gas, while at the same time the liquid or semi-liquid excitant is effectually prevented either from escaping or evaporating. The escape of the gas can be facilitated by using two pieces of rubber tubing, as before described.

The manner in which I carry out my invention will be readily understood by reference to the annexed drawings, in which—

Figure 3:
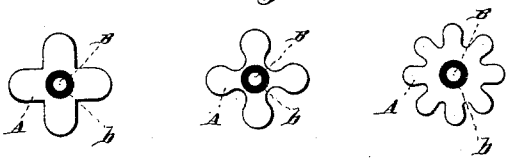
Figure 2:
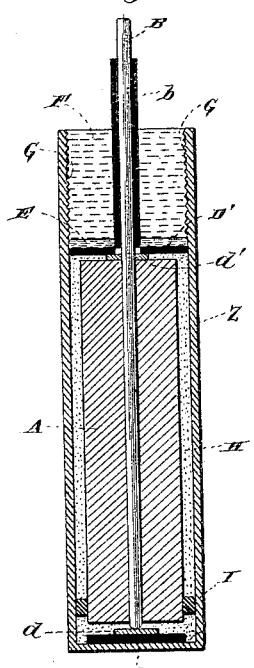
Figure 4:
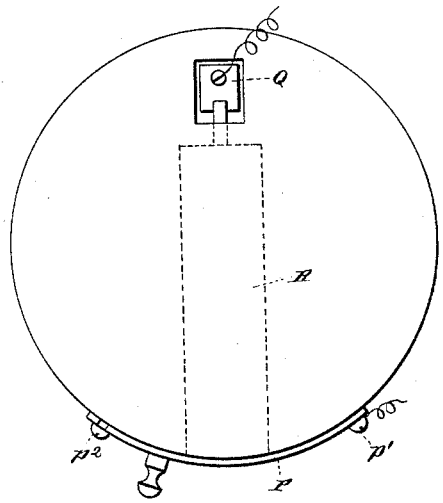
Figure 6:
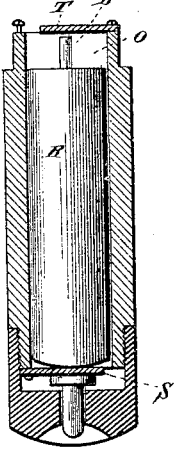
Figure 5:
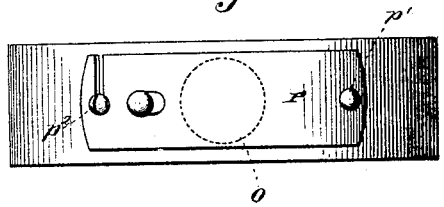

Figure 1 is a plan of the chloride-of-silver rod. Fig. 2 is a longitudinal section of the battery complete. Fig. 3 shows various forms in which the chloride of silver may be cast so as to form deep indentations, recesses, or corrugations on its surface, for the purposes specified. Figs. 4, 5, and 6 show my methods of connecting the battery with the line-wires of an electrical circuit.

In each figure similar letters indicate similar parts.

In Figs. 1, 2, and 3, A is the chloride of silver; B, the central wire or axis; $b$, the rubber tubing placed over the upper portion of the central wire B, and I the small rubber ring placed over the lower end of the chloride-of-silver rod. Z is the zinc tube or receiving-vessel; D D′, the lower and upper washers having silver-foil disks $d$ $d'$ attached or affixed thereto; E, a thin layer or film of paraffine on the upper side of the upper washer D′; F, the cement seal superimposed on the upper washer D′; and G G′, grooves cut in the upper portion of the inner circumference of the zinc tube Z, for the purpose of securely holding the cement seal, and H is the excitant.

In Figs. 4 and 5, O is a cylindrical slot or chamber formed in any suitable part of the apparatus intended to be actuated by the battery. P is a rigid metallic base closing the lower end of the chamber O, and in permanent connection with one of the line-wires of an electrical circuit. Q is a metallic spring in permanent connection with the other line-wire of an electrical circuit, and R is the battery, held firmly by the pressure of the spring Q between such spring and the base P, in such a manner as that the zinc electrode is in electrical contact with P and the silver electrode is in electrical contact with Q. The base P is pivoted at one end, as at $p'$, so as to admit of the ready insertion and withdrawal of the battery, and is furnished with a catch or fastening at the other end, as at $p^2$. In this method of connecting my battery the circuit is completed or broken by an ordinary circuit-closer placed at any point of the circuit.

In Fig. 6 the battery R is shown placed in the cylindrical slot or chamber O, loosely between the two spring-contact points S and T, so as to be normally out of electrical contact with the other elements forming the electrical circuits. In this method of connection the circuit is closed by the impact of a push-button against one of such contact-springs, thereby pushing the battery forward until each electrode comes into electrical contact with one of the contact-springs S and T. In this case one of such springs is made movable, as S, so as to permit of the ready insertion of the battery in the chamber O and of its withdrawal therefrom. When desired, a wire can be permanently attached to any part of the zinc tube Z, and the battery can be connected by wires in the ordinary way.

I do not confine myself to the precise details herein described, and shown in the annexed drawings, as many variations or modifications may be made therein without in any way departing from the principles of my invention.

What I claim is—

1. In a chloride-of-silver battery, the combination of a zinc vessel containing the negative element and the exciting medium, and also forming the positive element, with a negative element composed of chloride of silver cast in the form of a rod having an indented or corrugated surface, as and for the purposes described.

2. In a chloride-of-silver battery, the combination of the chloride-of-silver rod A with the washers D D′ and the silver disks $d$ $d'$, for the purposes specified.

3. In a chloride-of-silver battery, the combination of the chloride-of-silver rod A with the rubber tubing $b$, placed over the upper portion of the central wire B, as and for the purposes specified.

4. In a galvanic battery, the use of a seal formed of Portland cement or other similar cement pervious to hydrogen gas, but impervious to water or other liquid, superimposed upon a non-conducting washer, as described, for the purpose of confining the excitant.

5. In a galvanic battery, the use of a compound seal formed of a closely-fitting washer formed of non-conducting material, a thin layer or film of paraffine placed over such washer, and a layer of Portland cement or other similar cement pervious to hydrogen gas, but impervious to water or other liquid, superimposed on such washer.

6. In a galvanic battery, the combination of a zinc vessel containing the negative element, the exciting medium, and the seal for confining such exciting medium, and also forming the positive element and its electrode, with a cement seal pervious to hydrogen gas, but impervious to water or other liquid, superimposed upon a non-conducting washer, substantially as described, and for the purposes set forth.

7. In a galvanic battery, the combination of a zinc electrode forming the receiving-vessel for the other parts of the battery, a chloride-of-silver rod, and a compound seal formed of a close fitting non-conducting washer, a film or layer of paraffine spread on such washer for preventing contact of the excitant with the cement, and a superimposed layer of Portland cement or other similar hard porous cement pervious to hydrogen gas, but impervious to water or other liquids, and the circumferential grooves formed in the upper part of the receiving-vessel for the purpose of engaging with the cement seal, substantially as described.

8. In a galvanic battery, the combination of the zinc receiving-vessel Z, forming the positive element of the battery, the chloride-of-silver rod A, forming the negative element, the washers D D', the silver-foil disks $d$ $d'$, the rubber tubing $b$, and Portland-cement seal F, all substantially as described, and for the purposes specified.

9. In a galvanic battery, the combination of the sealed battery R with the cylindrical chamber O, the contact-spring Q, and the rigid movable base-plate P, as and for the purposes described.

10. In an electrical apparatus, the combination of a chloride-of-silver battery having an electrode at each end, a movable metallic base or support of such battery permanently connected with one of the line-wires forming the electrical circuit, such base being so arranged as to be in contact with one electrode of the battery, and a metallic spring-contact permanently connected with the other line-wire of the circuit, and so arranged as to be in contact with the other electrode of the battery.

Dated this 15th day of September, 1890.

PHILIP HATHAWAY.

Witnesses:
V. I. WILSON,
CHAS. HATHAWAY.